Dec. 4, 1934.  L. D. LOVEKIN  1,983,514
RELIEF VALVE
Filed Aug. 10, 1933
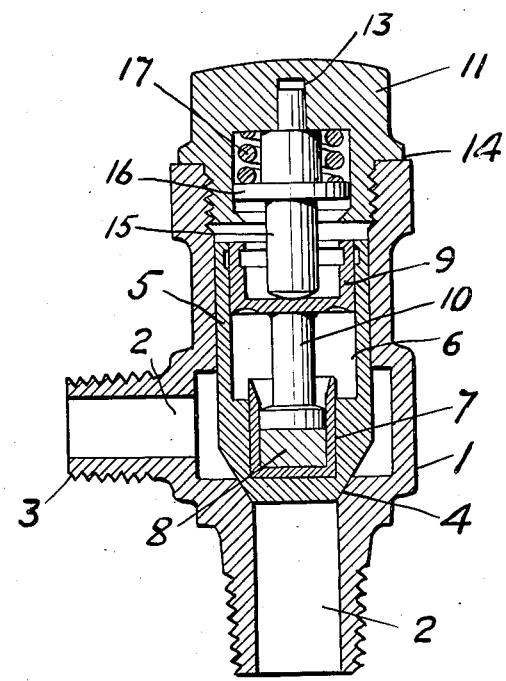
INVENTOR
Luther D. Lovekin
BY
Augustus B. Stoughton,
ATTORNEY.
WITNESS:

Patented Dec. 4, 1934

1,983,514

UNITED STATES PATENT OFFICE 1,983,514

RELIEF VALVE

Luther D. Lovekin, Villanova, Pa., assignor to Kitson Company, Philadelphia, Pa., a corporation of West Virginia Application August 10, 1933, Serial No. 684,486

2 Claims. (Cl. 137—161)

The principal object of the present invention is to avoid drip from the drain of a temperature relief valve such as takes place due to the cracking or partial opening of the valve under liquid pressure when the fusible element softens or becomes plastic insufficiently to permit of wide opening of the valve but sufficiently to permit of the embedment in it of a valve cooperating member. To this and other ends hereinafter set forth or appearing the invention, generally stated, comprises a construction to be hereinafter described by which the valve closing-spring is solidly compressed by the manual assembly of the parts so that its elongation due to embedment of a valve co-operating member in the partially softened fusible element does not diminish its force sufficiently to allow the valve to open or crack under normal fluid pressure.

The invention also comprises the improvements to be presently described and finally claimed.

In the following description reference will be made to the accompanying drawing forming part hereof and in which:

The single figure is a cross sectional view of a valve embodying features of the invention.

In the drawing 1 is a housing having a fluid way 2, to a drain 3, and a valve seat 4 in the fluid way. 5 is a valve slidable in the housing towards and away from the seat 4 and having an axial chamber 6 including a pocket 7. 8 is a fusible element arranged in the pocket. 9 is a slidable piston guided in the chamber 6 and adapted to restrain splash from the fusible member 8. The piston 9 is provided with a rod 10 seated on the fusible member 8. 11 is a cap threadedly mounted in the housing and having a cavity, including a plunger guide 13. 14 is a stop flange for positioning the cap. 15 is a plunger guided in the plunger guide 13 and axially aligned with the rod 10 and bearing on the piston 9 and having a spring supporting flange 16. By this construction absolute alignment of the parts is unnecessary. 17 is a spiral spring encircling the plunger and arranged between the cap 11 and the spring supporting flange 16 and this spring is normally held in solid compression between the cap 11 and fusible member 8.

The solid compression of the spring 17 is provided and ensured when the cap 11 is screwed down on its stop 14, by reason of the combined length of the portion of the plunger and piston between the spring and the fusible member; thus if the rod 10 extending from the piston embeds itself in the fusible member, such embedment is compensated for by the elongation of the spring which still retains sufficient force to hold the valve to its seat against normal pressure of the fluid on the valve.

It will be obvious to those skilled in the art that modifications may be made in details of construction and arrangement and in matters of mere form without departing from the spirit of the invention which is not limited to such matters, or otherwise than the prior art and the appended claims may require.

I claim:

1. A temperature relief valve comprising a housing having a fluid way to a drain and a valve seat in the fluid way, a valve slidable in the housing towards and away from said seat and having an axial chamber including a pocket, a fusible member in the pocket, a slidable piston guided in the chamber and adapted to restrain splash from the fusible member and having a rod seated on the fusible member, a cap threadedly mounted in the housing and having a spring receiving cavity, said cavity including a plunger guide, a plunger guided in the plunger guide and axially aligned with the piston rod and bearing on the piston and having a spring supporting flange, a spiral spring encircling the plunger and arranged between the cap and spring supporting flange and normally held in solid compression between the cap and fusible member, whereby small opening of the valve by normal liquid pressure and drip at the drain is prevented.

2. A temperature relief valve comprising a housing having a fluid way to a drain and a valve seat in the fluid way, a valve slidable in the housing towards and away from said seat and having an axial chamber including a pocket, a fusible member in the pocket, a slidable piston guided in the chamber and adapted to restrain splash from the fusible member and having a rod seated on the fusible member, a cap threadedly mounted in the housing and having a spring receiving cavity, said cavity including a plunger guide, a plunger guided in the plunger guide and axially aligned with the piston rod and bearing on the piston and having a spring supporting flange, a spiral spring encircling the plunger and arranged between the cap and spring supporting flange the combined length of the piston rod and plunger from the fusible member to the spring support being sufficient to hold the spring normally in solid compression whereby the pressure of the valve on its seat is maintained and drip is prevented even if the fusible member becomes plastic when subjected to heat.

LUTHER D. LOVEKIN.